(12) United States Patent
Hane

(10) Patent No.: US 12,071,196 B1
(45) Date of Patent: Aug. 27, 2024

(54) VEHICLE AND ASSOCIATED COMPONENTS

(71) Applicant: WORLDWIDE LIVE SHOPPING LLC, Aventura, FL (US)

(72) Inventor: Florencia Hane, Aventura, FL (US)

(73) Assignee: WORLDWIDE LIVE SHOPPING LLC

( * ) Notice: Subject to any disclaimer, the term of this patent is extended or adjusted under 35 U.S.C. 154(b) by 0 days.

(21) Appl. No.: 18/368,592

(22) Filed: Sep. 15, 2023

(51) Int. Cl.
*B62K 5/027* (2013.01)
*B62J 1/08* (2006.01)
*B62J 9/21* (2020.01)
*B62J 25/04* (2020.01)
*B62K 23/02* (2006.01)
*B62M 7/02* (2006.01)

(52) U.S. Cl.
CPC ............ *B62K 5/027* (2013.01); *B62J 1/08* (2013.01); *B62J 9/21* (2020.02); *B62J 25/04* (2020.02); *B62K 23/02* (2013.01); *B62M 7/02* (2013.01)

(58) Field of Classification Search
CPC .. B62K 5/027; B62K 23/02; B62J 9/21; B62J 25/04; B62J 1/08; B62M 7/02
See application file for complete search history.

(56) References Cited

U.S. PATENT DOCUMENTS

| | | | | | |
|---|---|---|---|---|---|
| 4,336,964 | A | * | 6/1982 | Pivar | B62K 5/027 296/78.1 |
| 7,207,407 | B2 | * | 4/2007 | Huber | B62K 15/006 280/62 |
| 8,113,307 | B2 | * | 2/2012 | Holland | B60W 10/08 180/65.6 |
| 8,678,123 | B2 | * | 3/2014 | Tako | B62J 17/08 180/215 |
| 10,106,218 | B2 | * | 10/2018 | Hsu | B62K 5/10 |
| 11,745,819 | B2 | * | 9/2023 | Schultz | B62D 37/00 180/216 |
| 2018/0281886 | A1 | * | 10/2018 | Mizuno | B62D 9/02 |

FOREIGN PATENT DOCUMENTS

| | | | |
|---|---|---|---|
| JP | 2019189054 A | * | 10/2019 |
| JP | 2022083251 A | * | 6/2022 |
| JP | 2024007672 A | * | 1/2024 |

* cited by examiner

*Primary Examiner* — Faye M Fleming
(74) *Attorney, Agent, or Firm* — Jose Cherson Weissbrot

(57) ABSTRACT

The vehicle is designed to provide optimal comfort and versatility for users. This vehicle allows the user to operate it both in a standing and sitting position. The vehicle comprises a frame assembly with various detachable components such as a rear wheel arrangement, a motor, a handle assembly, a front wheel, and a seat assembly. The seat assembly incorporates a unique combination of materials for enhanced comfort, and the vehicle offers additional features like a storage bag, support wheels, and a brake assembly.

10 Claims, 9 Drawing Sheets

VEHICLE AND ASSOCIATED COMPONENTS

CROSS REFERENCE TO RELATED APPLICATIONS

The present invention claims priority under 35 United States Code, Section 119 on the provisional application numbered 63/407,174 filed on Sep. 16, 2022, the disclosure of which is incorporated by reference.

FIELD OF THE INVENTION

The present invention relates generally to the field of a vehicle and associated components, and, more particularly relates to a vehicle that provides comfort to a user to drive the vehicle in a standing position or in a sitting position.

BACKGROUND

A number of vehicles, such as electric bikes and or scooters are known in the art. However, all these vehicles are segregated in different categories. Electric bikes are designed to be driven in a sitting position and have small foot rest. Further, segways are designed to be driven in a standing position as they have ample foot space but fail to provide seat to drive it in the sitting position. Further, these vehicles are quite heavy and difficult to lift and fit in trunks of the vehicles.

There may lack vehicles known in the art that are light weight and provide the comfort to a user to drive the vehicle in the standing position as well as in the sitting position and have a comfortable seat.

Accordingly, there exists a need for a vehicle that is light weight and provides the comfort to a user to drive the vehicle in the standing position or in the sitting position.

SUMMARY

Some of the objects of the present disclosure, which at least one embodiment herein satisfies, are as follows:

An object of the present invention is to ameliorate one or more problems of the prior art or to at least provide a useful alternative.

Another object of the present invention is to provide a vehicle and associated components.

Yet another object of the present invention is to provide a vehicle that provides comfort to a user to drive the vehicle in standing position or in sitting position.

Other objects and advantages of the present invention will be more apparent from the following description, which is not intended to limit the scope of the present invention.

In view of the above objects, in one aspect, the present disclosure provides a vehicle. The vehicle is designed to provide the comfort to a user to drive the vehicle in standing position or in a sitting position according to one embodiment of the present disclosure.

The present invention discloses a vehicle for standing and sitting operation. The vehicle is designed to provide optimal comfort and versatility for users. This vehicle allows the user to operate it both in a standing and sitting position. The vehicle comprises a frame assembly with various detachable components such as a rear wheel arrangement, a motor, a handle assembly, a front wheel, and a seat assembly. The seat assembly incorporates a unique combination of materials for enhanced comfort, and the vehicle offers additional features like a storage bag, support wheels, and a brake assembly.

The frame assembly has a front side, a rear side, and a medial region. The pair of footrest spaces are provided on the frame assembly, extending from the medial region to the rear side. The Rear wheel arrangement is detachably coupled to the rear side of the frame assembly.

The motor is detachably coupled to the medial region of the frame assembly and mechanically connected to the rear wheel arrangement for driving the rear wheel arrangement. The motor is strategically positioned between the pair of footrest spaces on the frame assembly, optimizing weight distribution and balance. The motor can be selected from a rechargeable battery-driven electric motor or a fuel-driven engine, providing flexibility in power sources.

The handle assembly is detachably coupled with the frame assembly and connected to the motor, facilitating user control and maneuverability. The Front wheel is coupled with the handle assembly. The handle assembly is adjustably telescopic and collapsible, allowing user customization, and it is detachably attached to the front side of the frame assembly. The vehicle may include a detachable storage bag (116) coupled to the handle assembly, offering convenience for users.

The seat assembly comprises a seat and a coupling rod, it is detachably attached to the rear side of the frame assembly. The seat comprises an optron layer, a memory foam layer, and a fabric layer. The optron layer is made up of multi-density microcellular polyurethane foam, enhancing comfort. The memory foam layer is provided for additional cushioning. The fabric layer is an optional layer provided for a comfortable and durable seating surface.

In an embodiment, at least one small wheel is coupled at the center of the rear side of the vehicle to provide additional support and stability to the frame assembly.

The vehicle incorporates a brake assembly coupled to the handle assembly, the rear wheel arrangement, and the front wheel. Users can control the brake assembly through the handle assembly, allowing for efficient braking of both the rear wheel arrangement and the front wheel.

The vehicle is either a 2-wheeler, or a 3-wheeler, or a 4-wheeler scooter, offering versatility to suit various user preferences and needs.

These aspects of the present disclosure, along with the various features of novelty that characterize the present disclosure, are pointed in the below description. For a better understanding of the present disclosure, its operating advantages, and the specific objects attained by its uses, reference should be made to the accompanying drawing and descriptive matter in which there is illustrated an exemplary embodiment of the present disclosure.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

Like reference numerals refer to like parts throughout the description of several views of the drawings.

DETAILED DESCRIPTION OF EMBODIMENTS

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the foams "a," "an," and "the" may be intended to include the plural foams as well, unless the context clearly suggests otherwise. The terms "comprises," "comprising," "including," and "having," are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

Figure 1:
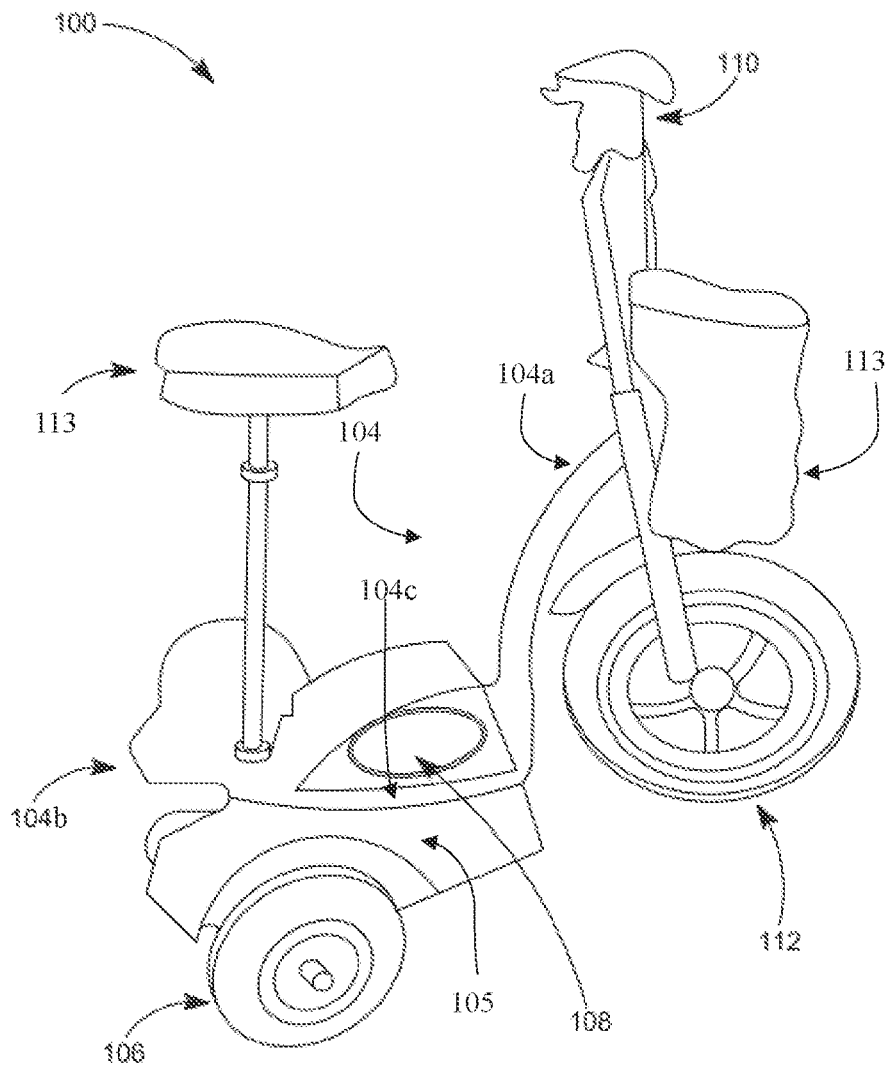
FIG. 1 illustrates a side view of one such vehicle, in accordance with an exemplary embodiment with of the present disclosure.

In an aspect, the present disclosure provides vehicle. FIG. 1 illustrates a side view of a vehicle 100 that provides the comfort to a user 102 to drive the vehicle 100 in a standing position or in a sitting position, according to one exemplary embodiment of the present disclosure. The vehicle is a 3-tyre scooter or a 4-tyre scooter. The vehicle 100 is designed to provide optimal comfort and versatility for users 102. This vehicle 100 allows the user 102 to operate it both in a standing and sitting position. The vehicle 100 comprises a frame assembly 104 with various detachable components such as a rear wheel arrangement 106, a motor 108, a handle assembly 110, a front wheel 112, and a seat assembly 113. The seat assembly 113 incorporates a seat 114 that is prepared from a unique combination of materials for enhanced comfort, and the vehicle offers additional features like a storage bag 116, support wheels 118, and a brake assembly (not shown in the figure).

The frame assembly 104 has a front side 104a, a rear side 104b, and a medial region 104c. The frame assembly 104 may have ample foot rest spaces 105 for the user 102 to stand on vehicle 100. The pair of footrest spaces 105 are provided on the frame assembly, extending from the medial region to the rear side.

The rear wheel arrangement 106 is detachably coupled to the rear side of the frame assembly. In an embodiment wherein the vehicle is 3-wheeler scooter, the rear wheel arrangement 106 may comprise a pair of wheels coupled with each other through an axle. The axle is coupled to the frame assembly 104 through at least one bearing. The footrest space 105 is provided on the frame assembly 104 and between the two wheels of the rear wheel arrangement. The footrest space 105 is strategically positioned between the two wheels of the rear wheel arrangement, for optimizing weight distribution and balance.

The motor 108 is coupled to the frame assembly 104 and the rear wheel arrangement 106. The motor 108 is configured to drive/rotate the wheels of the rear wheel arrangement 106. In an embodiment, the motor 108 is detachably coupled to the medial region 104c of the frame assembly 104 and mechanically connected to the rear wheel arrangement 106 for driving the rear wheel arrangement 106. The motor (108) is strategically positioned between the pair of footrest spaces (105) on the frame assembly, optimizing weight distribution and balance. The motor (108) can be selected from a rechargeable battery-driven electric motor or a fuel-driven engine, providing flexibility in power sources.

The handle assembly 110 is coupled with the frame assembly 104 and the motor 108. The handle assembly 110 enable the user 102 to control the movement of the vehicle 100. The front wheel 112 is coupled with the handle assembly 110. The seat 114 is attached to the frame assembly 102.

The motor is selected from a battery driven electric motor or a fuel driven engine motor. In a preferred embodiment, the motor is a rechargeable battery driven electric motor.

Figure 2:
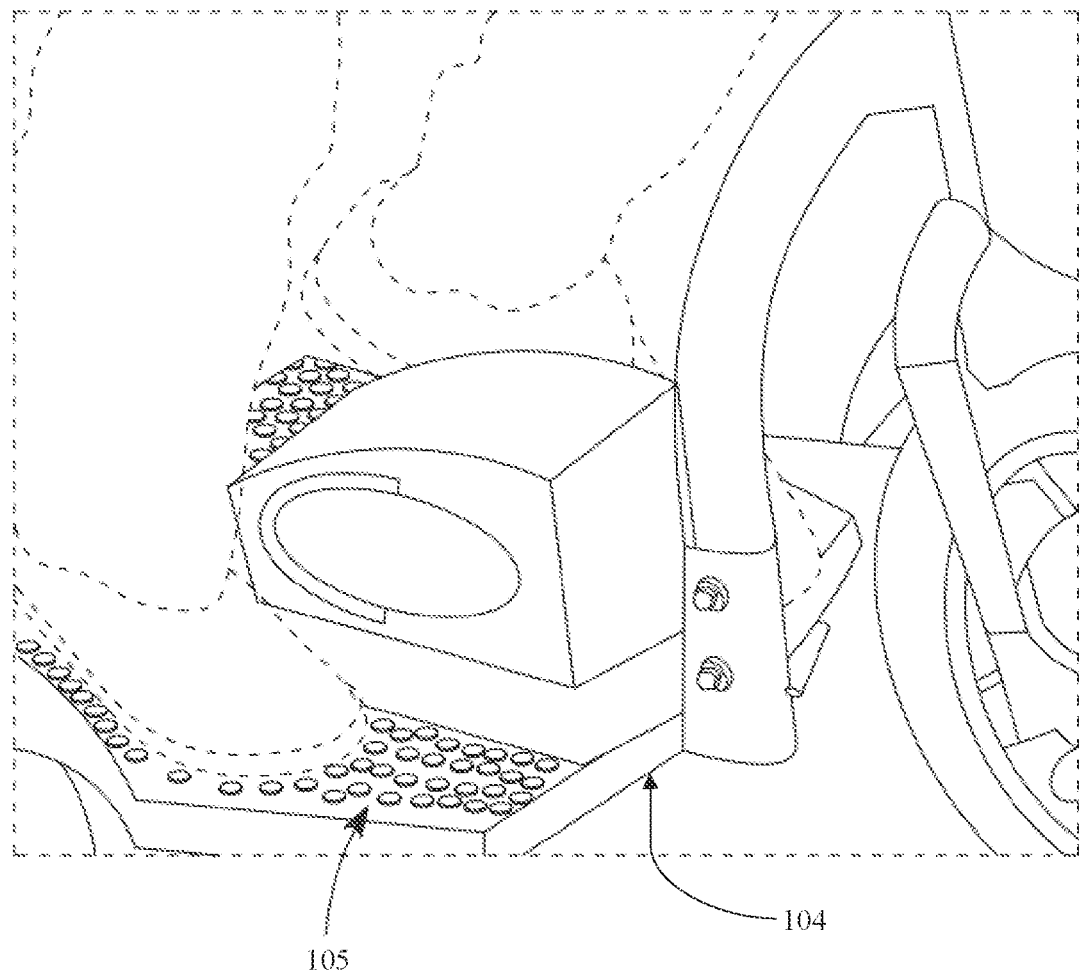
FIG. 2 illustrates a side view of a frame assembly of the vehicle, in accordance with an exemplary embodiment of the present disclosure.

FIG. 2 illustrates a side view of the frame assembly 104 of the vehicle 100, in accordance with an exemplary embodiment the present disclosure. The frame assembly (104) may include ample foot rest spaces 105 for the user 102 to stand on the vehicle 100.

In an embodiment, at least one small support wheel (118) is coupled at the center of the rear side (104b) of the vehicle (100) to provide additional support and stability to the frame assembly (104).

Figure 3:
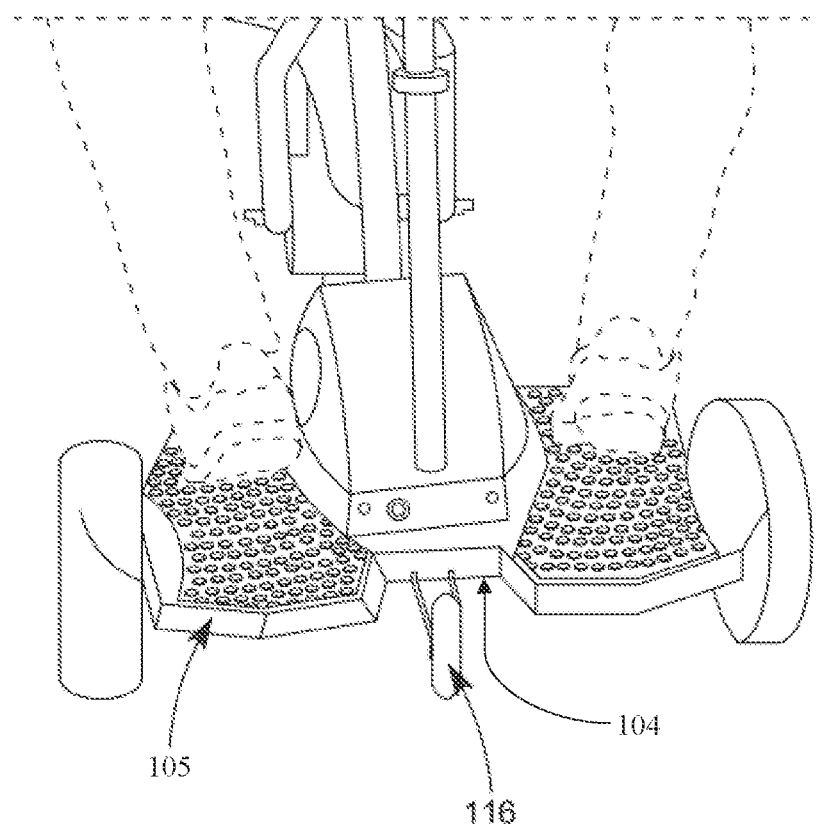
FIG. 3 illustrates a back view of a frame assembly of the vehicle, in accordance with an exemplary embodiment of the present disclosure.

FIG. 3 illustrates a back view of the frame assembly 104 of the vehicle 100, in accordance with an exemplary embodiment the present disclosure. In an embodiment, a small support wheel 116 is provided on the back side of the vehicle to provide support to the frame assembly 104.

Figure 4:
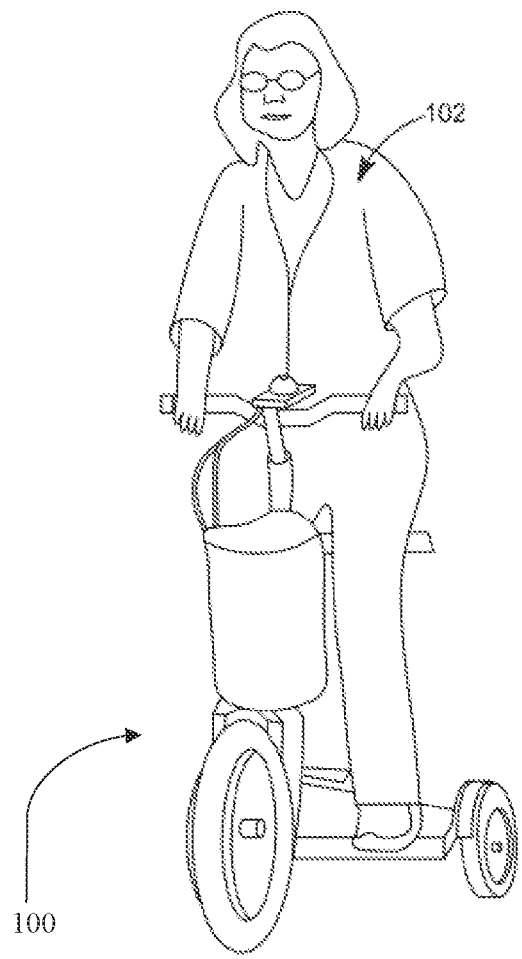
FIG. 4 illustrates a perspective view of the vehicle used by a user in a standing position, in accordance with an exemplary embodiment of the present disclosure.

FIG. 4 illustrates is a perspective view of the vehicle 100 used by user 102 in a standing position, in accordance with an exemplary embodiment the present disclosure.

Figure 5:
FIG. 5 illustrates a perspective view of the vehicle used by user in a sitting position, in accordance with an exemplary embodiment of the present disclosure.

FIG. 5 illustrates a perspective view of the vehicle 100 used by a user 102 in the sitting position, in accordance with an exemplary embodiment the present disclosure.

In an embodiment, the handle assembly 110 is detachably coupled with the frame assembly 104 and connected to the motor 108, facilitating user control and maneuverability. The front wheel 112 is coupled with the handle assembly. The handle assembly 110 is adjustably telescopic and collapsible, allowing user customization, and it is detachably attached to the front side of the frame assembly 104. The vehicle 100 may include a detachable storage bag 116 coupled to the handle assembly 110, offering convenience for users 102.

The seat assembly 113 comprises a seat 114 and a coupling rod 115. The Seat assembly 113 is detachably attached to the rear side 104b of the frame assembly 104. The seat (114, 200) comprises an optron layer (202), a memory foam layer (204), and a fabric layer (206). The optron layer (202) is made up of multi-density microcellular polyurethane foam, enhancing comfort. The memory foam (204) layer is provided for additional cushioning. The Fabric layer (206) is an optional layer provided for a comfortable and durable seating surface.

Figure 6:
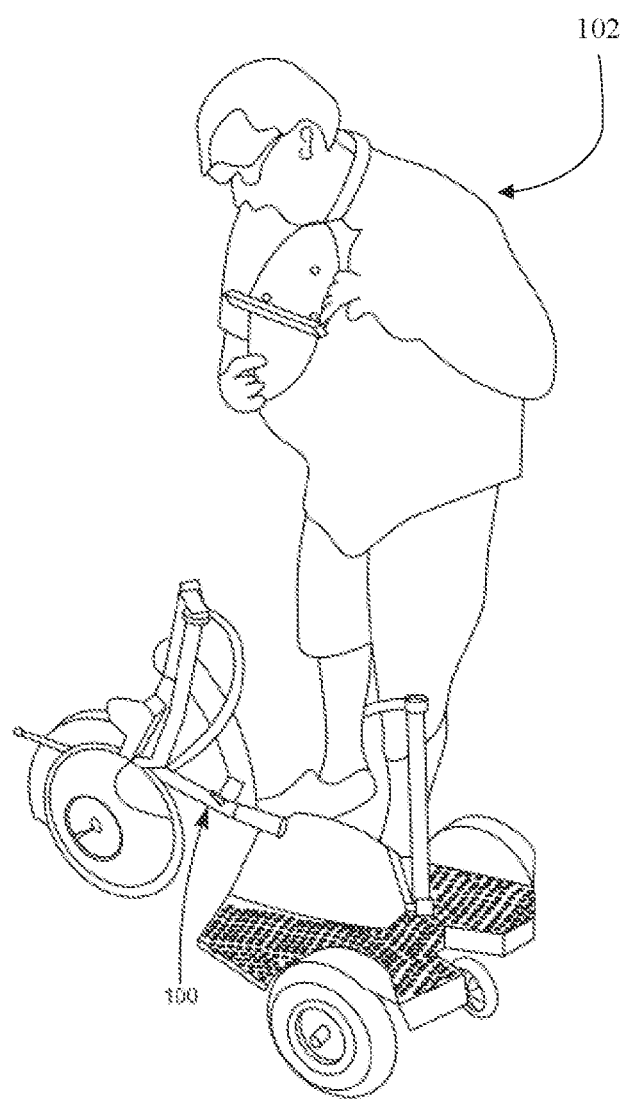
FIG. 6 illustrates a perspective view of the vehicle, wherein a handle is collapsed and a seat is detached, in accordance with an exemplary embodiment of the present disclosure.

FIG. 6 illustrates a perspective view of the vehicle 100, wherein the handle assembly 110 is collapsed and the seat 114 is detached, in accordance with an exemplary embodiment of the present disclosure. The vehicle 100 disclosed in the present disclosure is a light weight vehicle that can easily be lifted and placed in trunk of a car after detaching the seat 114 and collapsing the handle 110, as shown in FIG. 6. The vehicle 100 is a light weight, that may, with limiting, have weight in a range of 7 kg to 35 kg.

Figure 7:
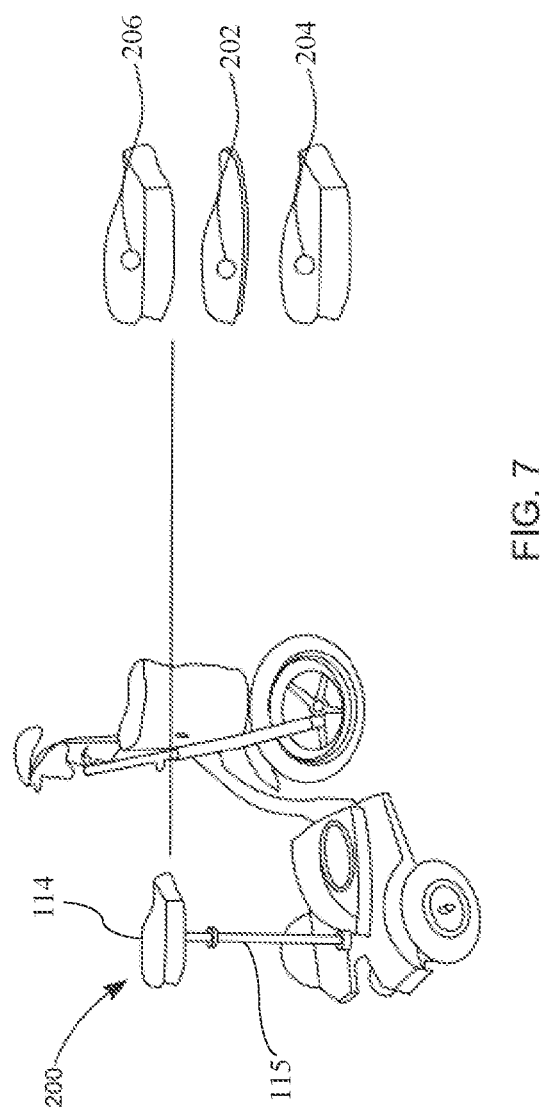
FIG. 7 illustrates an exploded view of a seat of the vehicle, in accordance with an exemplary embodiment of the present disclosure.

In an embodiment, as illustrated in FIG. 7 the seat 114 of the seat 114, 200 may include at least one layer of fabric 206 as a first layer, at least one layer of optron 202 as a second layer, and at least one layer of memory foam 204 as a third layer. The second layer is sandwiched between the first layer and the second layer. The second lay is an optron, which is a multi-density microcellular polyurethane foam.

Figure 8:
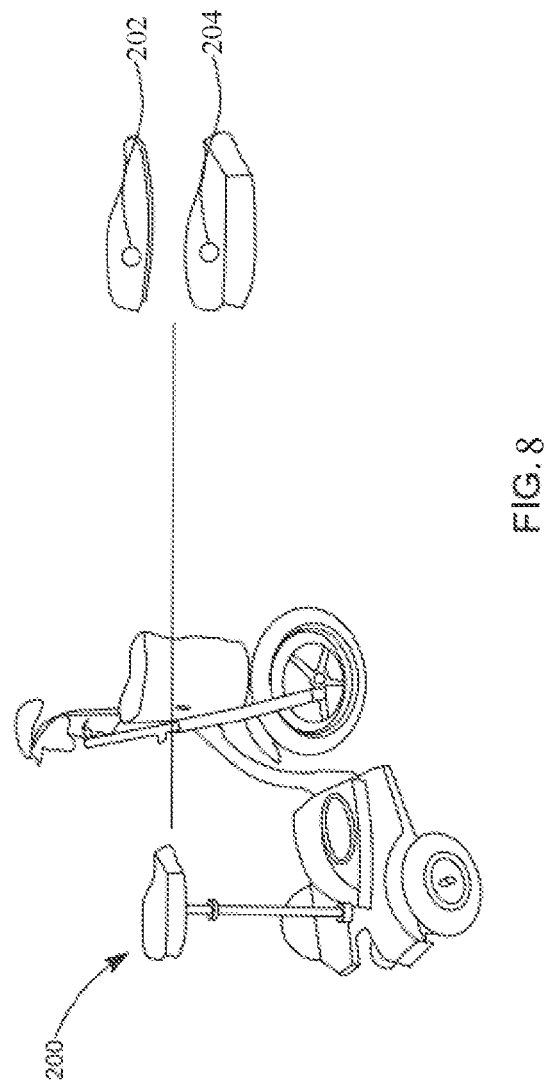
FIG. 8 illustrates an exploded view of a seat of the vehicle, in accordance with another exemplary embodiment of the present disclosure.

In another embodiment, as illustrated in FIG. 8 the seat 114 of the seat 114, 200 includes a first layer of optron 202 and a second layer of memory foam 204.

Optron is a unique cushioning material, which may custom foamulated to add additional comfort and reduce fatigue when combined with other foams. Optron is the easiest, most cost-effective way to improve comfort.

Optron Key Comfort advantages are absorbs negative impact; superior compression set performance over other materials; single and multi-density polyurethane construction; Delivers superior cushioning to maximize comfort; Attenuates shock and provides excellent energy returns for maximum performance; Microcellular polyurethane formula delivers superior cushioning to maximize comfort; Independent lab tests confirm Optron deliver superior compression set performance over the other materials, retaining the shape for longer lasting comfort; Multi-density construction provides extra support and comfort in critical areas and Static dissipative properties.

Figure 9:
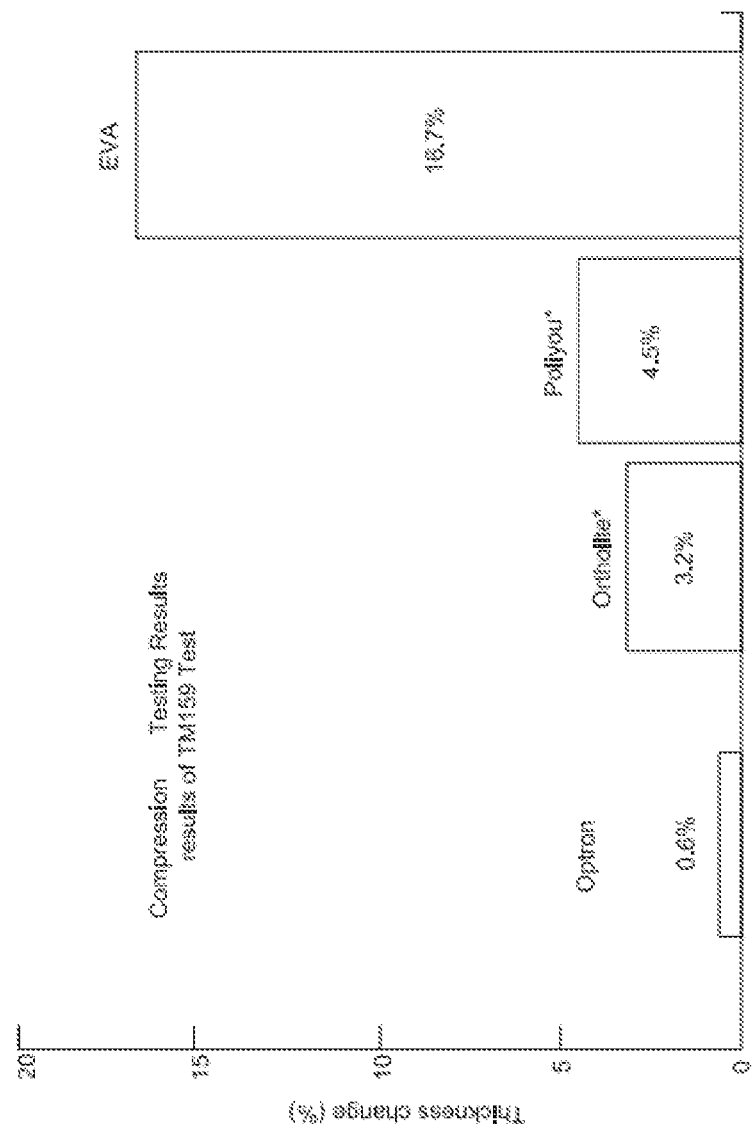
FIG. 9 illustrates a comparison of compression set test of optron with other seat materials that are conventionally used.

FIG. 9 illustrates a comparison of the compression set test of optron with other seat materials that are conventionally used. The compression test TM159 is performed on the 4 seats of uniform size and shape, wherein the first seat is of optron, second seat is ortholite, third seat is of pollyou and forth seat is of EVA (Ethylene vinyl acetate). The seat prepared from the optron outperformed all other seats in the test by showing the least thickness change on the application of uniform compression.

The vehicle (100) incorporates a brake assembly coupled to the handle assembly, the rear wheel arrangement, and the front wheel. Users can control the brake assembly through the handle assembly, allowing for efficient braking of both the rear wheel arrangement and the front wheel.

The vehicle (100) is either a 2-wheeler, or a 3-wheeler, or a 4-wheeler scooter, offering versatility to suit various user preferences and needs.

The present disclosure described hereinabove may include several technical advantages including, but not limited, to a vehicle. For example, the vehicle of the present disclosure may provide comfort to a user to drive the vehicle in the standing position or in the sitting position. The vehicle is foldable and is of light weight. Multi-layered seat may provide additional comfort, in which, optron is the easiest, most cost-effective way to improve comfort.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

What is claimed is:

1. A vehicle for providing comfort to a user to drive the vehicle in a standing position or in a sitting position, the vehicle comprising:
    a frame assembly having a front side, a rear side, and a medial region;
    a pair of footrest spaces provided on the frame assembly starting from the medial region till the rear side;
    a rear wheel arrangement detachably coupled to the rear side of the frame assembly;
    a motor detachably coupled to the medial region of the frame assembly and mechanically coupled with the rear wheel arrangement, wherein the motor is configured to drive the rear wheel arrangement;
    a handle assembly is detachably coupled with the frame assembly and coupled with the motor, wherein the handle assembly enables the user to control the movement and maneuverability of the vehicle;
    a front wheel coupled with the handle assembly; and
    a seat assembly having a seat and a coupling rod, wherein the seat assembly is detachably attached to the rear side the frame assembly.

2. The vehicle as claimed in claim 1, wherein the seat comprises:
    at least one layer of optron, wherein the optron is a multi-density microcellular polyurethane foam, and
    at least one layer of memory foam.

3. The vehicle as claimed in claim 2, wherein the seat further comprises:
    at least one layer of fabric.

4. The vehicle as claimed in claim 1, wherein the motor is provided between the pair of footrest spaces on the frame assembly.

5. The vehicle as claimed in claim 1, wherein the handle assembly is adjustably telescopic and collapsible, and detachably attached to the front side of the frame assembly.

6. The vehicle as claimed in claim 1, wherein the motor is selected from a rechargeable battery-driven electric motor or a fuel-driven engine.

7. The vehicle as claimed in claim 1 further comprising a storage bag detachably coupled to the handle assembly.

8. The vehicle as claimed in claim 1, further comprising at least one small support wheel coupled at the center of the rear side of the vehicle to provide support to the frame assembly.

9. The vehicle as claimed in claim 1, further comprises a brake assembly coupled to the handle assembly, the rear wheel arrangement and front-wheel, wherein the brake assembly is configured to be controlled through the handle assembly to apply brake to the rear wheel arrangement and the front-wheel.

10. The vehicle as claimed in claim 1, wherein the vehicle is a 2-wheel scooter or a 3-wheel scooter or a 4-wheel scooter.

* * * * *